US011115898B2

(12) United States Patent
Calcev

(10) Patent No.: US 11,115,898 B2
(45) Date of Patent: Sep. 7, 2021

(54) METHOD AND APPARATUS FOR DETERMINING LINE OF SIGHT (LOS)

(71) Applicant: Futurewei Technologies, Inc., Plano, TX (US)

(72) Inventor: George Calcev, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/600,008

(22) Filed: Oct. 11, 2019

(65) Prior Publication Data

US 2020/0045608 A1 Feb. 6, 2020

Related U.S. Application Data

(63) Continuation of application No. PCT/US2018/056140, filed on Oct. 16, 2018.

(60) Provisional application No. 62/688,851, filed on Jun. 22, 2018, provisional application No. 62/573,063, filed on Oct. 16, 2017.

(51) Int. Cl.
*H04W 40/20* (2009.01)
*H04B 7/10* (2017.01)
*H04B 17/309* (2015.01)
*H04B 7/06* (2006.01)
*H04W 40/28* (2009.01)

(52) U.S. Cl.
CPC ........ *H04W 40/205* (2013.01); *H04B 7/0617* (2013.01); *H04B 7/10* (2013.01); *H04B 17/309* (2015.01); *H04W 40/28* (2013.01)

(58) Field of Classification Search
None
See application file for complete search history.

(56) References Cited

U.S. PATENT DOCUMENTS

| | | | |
|---|---|---|---|
| 9,264,124 B2 * | 2/2016 | Wu | H04B 7/10 |
| 2003/0231602 A1 | 12/2003 | Slemmer et al. | |
| 2013/0089339 A1 * | 4/2013 | Liu | H04B 10/613 398/152 |
| 2014/0206367 A1 * | 7/2014 | Agee | H04W 28/0236 455/450 |
| 2015/0215013 A1 * | 7/2015 | Strong | H04B 7/0452 370/336 |
| 2015/0382318 A1 * | 12/2015 | Kim | G01S 5/0054 455/456.5 |

(Continued)

OTHER PUBLICATIONS

Kasher, A, et al., "First Path BF text", IEEE P802.11 Wireless LANs, Jun. 8, 2017, 3 Pages.

*Primary Examiner* — Chi H Pham
*Assistant Examiner* — Vladislav Y Agureyev
(74) *Attorney, Agent, or Firm* — Slater Matsil, LLP

(57) ABSTRACT

A method performed by a first device is disclosed that includes sending a light of sight, LOS, determination request to a second device which communicates with the first device, wherein the LOS determination request includes an indication of a dual polarization procedure for Line of Sight (LOS), with the indication of the dual polarization procedure for LOS is used indicating that a same sequence of bits is sent at two polarizations to the same direction; a channel measurement for each of the two received sequences at the two polarizations is compared to determine whether a transmission between the first device and the second is LOS or NLOS.

30 Claims, 11 Drawing Sheets

(56) References Cited

U.S. PATENT DOCUMENTS

| | | | |
|---|---|---|---|
| 2016/0014722 A1* | 1/2016 | Yoon | H04B 7/0617 |
| | | | 455/426.1 |
| 2016/0149302 A1 | 5/2016 | Sanderovich et al. | |
| 2017/0070275 A1* | 3/2017 | Jo | H04B 7/0408 |
| 2017/0111218 A1* | 4/2017 | Kasher | H04L 41/0803 |
| 2017/0126379 A1 | 5/2017 | Choi et al. | |
| 2017/0201992 A1 | 7/2017 | Cordeiro et al. | |
| 2017/0301990 A1* | 10/2017 | Zhao | H01Q 25/001 |
| 2017/0317726 A1* | 11/2017 | Abdallah | H04B 7/0626 |
| 2017/0324599 A1 | 11/2017 | Lomayev et al. | |
| 2017/0338874 A1* | 11/2017 | Pratt | H04B 7/10 |
| 2018/0063693 A1* | 3/2018 | Chakraborty | H04W 8/005 |
| 2018/0367199 A1* | 12/2018 | Zimmerman | H01Q 25/001 |
| 2019/0200339 A1* | 6/2019 | Handte | G01S 5/0273 |
| 2019/0320405 A1* | 10/2019 | Pan | H04B 17/318 |
| 2020/0007241 A1* | 1/2020 | Miura | H04B 10/6165 |
| 2020/0091608 A1* | 3/2020 | Alpman | H01Q 21/24 |
| 2020/0204222 A1* | 6/2020 | Lou | H04B 7/0417 |

\* cited by examiner

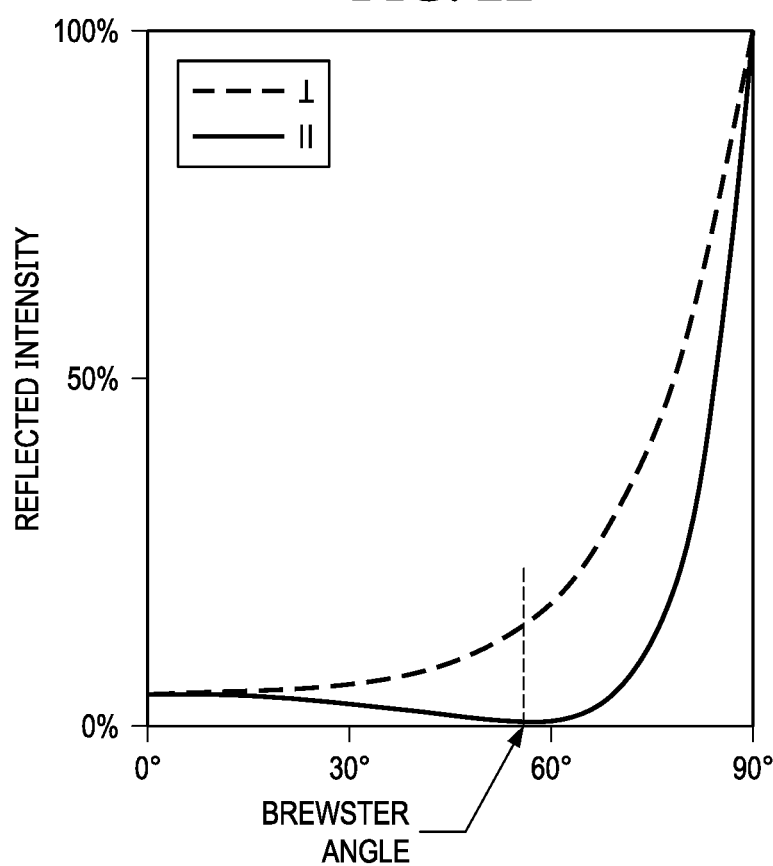

METHOD AND APPARATUS FOR DETERMINING LINE OF SIGHT (LOS)

CROSS-REFERENCE TO RELATED APPLICATIONS

This application is a continuation of International Application PCT/US2018/056140, filed on Oct. 16, 2018, and entitled "Method and Apparatus for Determining Line of Sight (LOS)," which claims priority to U.S. Provisional Application Ser. No. 62/688,851, filed Jun. 22, 2018, entitled "Method and Apparatus for Determining Line of Sight (LOS)," and U.S. Provisional Patent Application Ser. No. 62/573,063, filed Oct. 16, 2017, entitled "Method and Apparatus for Determining Line of Sight (LOS)," all of which are hereby incorporated herein by reference as if reproduced in their entities.

TECHNICAL FIELD

The present application relates to wireless communication, such as wireless local area network (WLAN) communications, and more particularly, but not exclusively, to a method for Determining Line of Sight (LOS) for use in wireless communications.

BACKGROUND

Time of flight (ToF) is used in many applications to estimate the distance between a transmitter and a receiver. The time of flight (ToF) is defined as a duration of propagation of a wave signal between the transmitter and the receiver. One way to estimate ToF is based on exchanging multiple frames with time stamps between the transmitter and the receiver. When the ToF is determined, a simple multiplication with the speed of light provides the estimation of the distance between transmitter and the receiver. Once the distance from an unknown location to at least three fixed points (with known coordinates) is determined, a simple triangulation (multilateration) algorithm could be used to obtain the location of the unknown point.

When the LOS path between transmitter and receiver is not available and the communication is only non-line of sight (NLOS), several copies of the transmitted signal are received due to reflections, where each copy of the signal corresponds to a different path of the propagation between transmitter and receiver and therefore has a different ToF. In the case on NLOS, the TOF for each path corresponds to the length of the path rather than to the geometric distance between the transmitter and the receiver. In this case the path length based on the ToF is obviously larger than the actual distance between the transmitter and the receiver, which in turn leads to error in the estimation of the location.

Therefore there is a requirement to know if the signal propagation (or a copy of it) corresponds to the LoS propagation in order to determine of the exact distance between the transmitter and the receiver.

SUMMARY

According to one embodiment, there is provided a method performed by a device, comprising: sending a message to a peer device which communicates with the device, wherein the message may include an indication of first path training to indicate the device sent the message supports to determine a shortest path from all the paths; and the message further may include an indication of line of sight (LOS) to indicate the device that sent the message supports to determine LOS or NLOS communication, where the determination is based on the repetition of the same message (or sequence of bits) toward the same direction and the same power with different polarizations.

According to other embodiment, there is provided a method performed by a device, comprising: sending a LOS determination request to a peer device which communicates with the device, wherein the LOS determination request includes an indication of which a dual polarization procedure for Line of Sight (LOS) is used to indicate that a same sequence of bits is sent at two polarizations to the same direction; a channel measurement for each of the received sequences at the two polarizations is compared to determine whether a transmission between the receiver and the transmitter is NLOS.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 2C and 2D illustrate an example of an electromagnetic wave during a reflection the wave polarization in physical layer;

DETAILED DESCRIPTION OF ILLUSTRATIVE EMBODIMENTS

In the following description, reference is made to the accompanying drawings that form a part hereof, and in which is shown by way of illustration specific embodiments which may be practiced. These embodiments are described in sufficient detail to enable those skilled in the art to practice the disclosure, and it is to be understood that other embodiments may be utilized and that structural, logical and electrical changes may be made without departing from the scope of the present disclosure. The following description of example embodiments is, therefore, not to be taken in a limited sense, and the scope of the present disclosure is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

When the direct path between a transmitter and a receiver is blocked, the propagation between transmitter and receiver is possible through a non-line of sight (NLOS). In other words the signal propagation is through the reflections and diffractions.

Figure 1A:
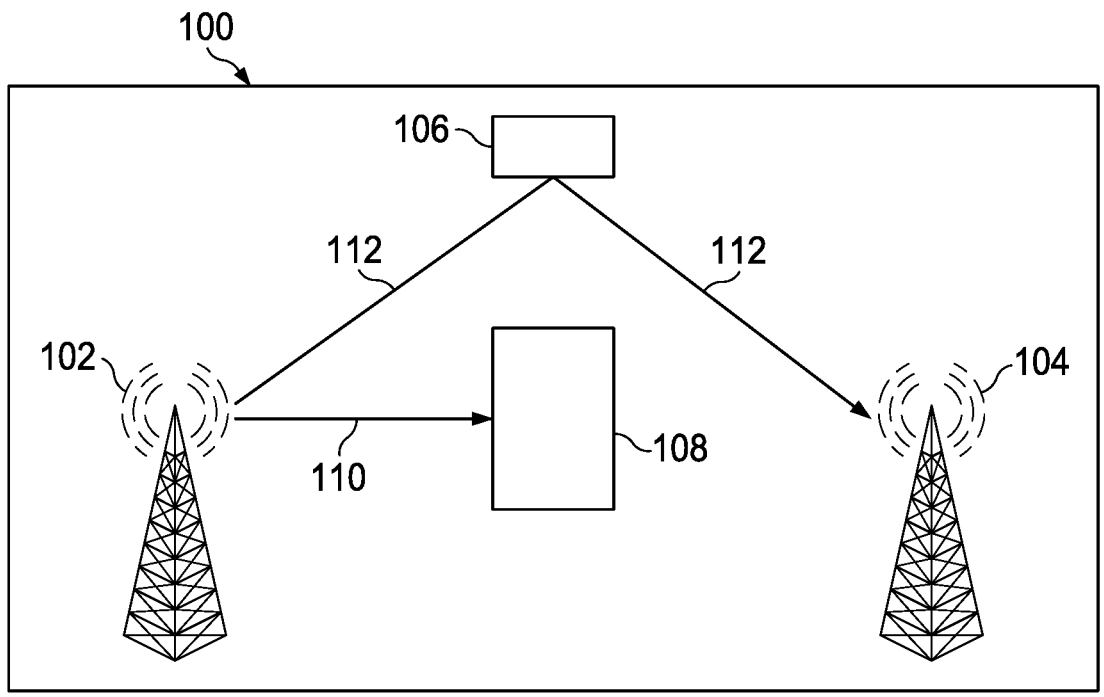
FIG. 1A illustrates an example of a communication system in the case of which the propagation between transmitter and receiver is as the non-line of sight (NLOS)

FIG. 1A illustrates an example a communication system 100 in the case of which the propagation between transmitter 102 and receiver 104 is as the non-line of sight (NLOS) communication system 100 that may be used for implementing the devices and methods disclosed herein. The system 100 may implement one or more channel access methods, including, but not limited to, methods such as code division multiple access (CDMA), time division multiple access (TDMA), frequency division multiple access (FDMA), orthogonal FDMA (OFDMA), or single-carrier FDMA (SC-FDMA).

In this example, the communication system 100 includes a transmitter 102 and a receiver 104. While certain numbers of these components or elements are shown in FIG. 1A, any number of these components or elements may be included in the system 100. In FIG. 1A, both the transmitter 102 and the receiver 104 may transmit and receive electromagnetic waves under multiple polarizations. And the transmitter 102 and the receiver 104 may be any entity capable of sending and receiving, including a base station, a mobile terminal, an access point, a wireless local area network (WLAN) station, etc.

The transmitter 102 may transmit repeatedly a same bit sequence carried in electromagnetic waves with different polarizations (for instance vertical polarization, horizontal polarization and 45 degrees polarization) to the receiver 104. The receiver 104 may receive the signal transmitted by the transmitter 102. For multi-path propagation, each path corresponds to one copy of the same transmission (which means each path corresponds to at least one reflection), such as the copies of 110 and 112 in FIG. 1A. In the case of which the propagation between the transmitter 102 and the receiver 104 is as the non-line of sight (NLOS) communication system 100, a blockage 108 is located between the transmitter 102 and the receiver 104. The signal copy will pass the blockage 108, such as the signal copy 110 should be blocked by the blockage 108. A reflector 106 may also be included between the transmitter 102 and the receiver 104. The signal copy, such as the signal copy 112 may be reflected by the reflector 106, and then transmitted to the receiver 104. The blockage 108 may block the signal sent to the receiver 104. In this example, for each transmission, the receiver 104 receives multiple copies of the same signal that propagates on different paths, none of them corresponding to an unobstructed (direct) path.

Figure 1B:
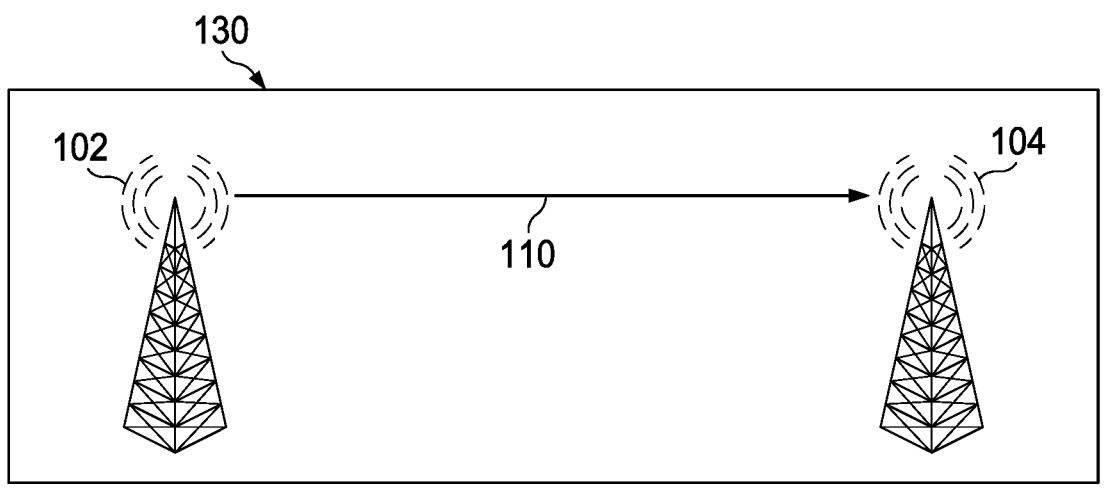
FIG. 1B illustrates an example of a communication system in the case of which the propagation between transmitter and receiver is as the line of sight (NLOS)

FIG. 1B illustrates an example a communication system 130 in the case of which the propagation between transmitter 102 and receiver 104 is as the line of sight (LOS) communication system 100 that may be used for implementing the devices and methods disclosed herein. In this case, no blockage located between the transmitter 102 and the receiver 104, and there is an unobstructed direct path between the two transceivers allowing for the signal 110 to be unobstructed. Therefore, the communication between the transmitter 102 and receiver 104 is LOS communication.

As noted in that, the transmitter 102 in the disclosure is a device, such as a base station, a mobile terminal, an access point, a wireless local area network (WLAN) station, and so on, which transmits signal to the receiver in certain examples. And the receiver 104 in the disclosure is a device, such as a base station, a mobile terminal, an access point, a wireless local area network (WLAN) station, and so on, which receives signal to the receiver in certain examples. In any example, the function of transmitter 102 and function of receiver 104 may be exchange.

Figure 2A:
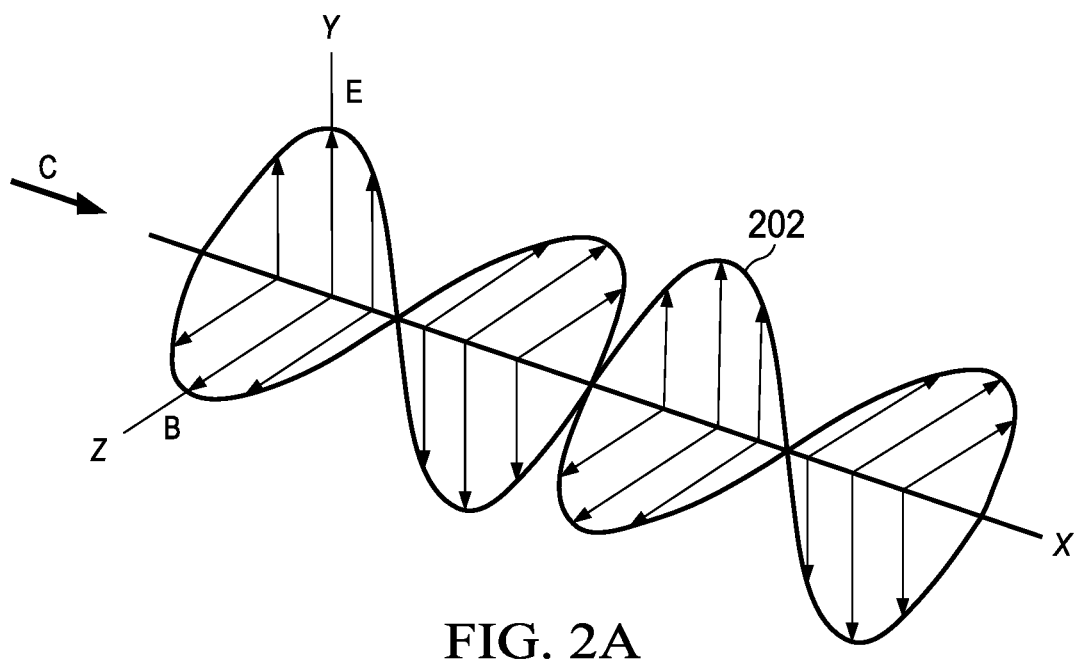
FIG. 2A illustrates an example of an electromagnetic wave is linear polarized.

FIG. 2A illustrates an example of an electromagnetic wave 202 that is linear polarized. In this example, a signal wave, such as the electromagnetic wave 202, is linear polarized (for example in "y" direction of FIG. 2A) if the electric field E vector oscillates in a single fixed plane. In FIG. 2, "E" represents the vector of electric intensity of the signal wave, "B" represents the vector of magnetic intensity of the signal wave. And c represents the speed of propagation of the electromagnetic wave. The signal wave in the FIG. 2A is linearly polarized because "E" oscillates only in the plane (x-y), and signal wave (such as Electromagnetic wave) is the combination of the two vectors oscillations (such as the magnetic intensity B and the electric intensity E).

Figure 2B:
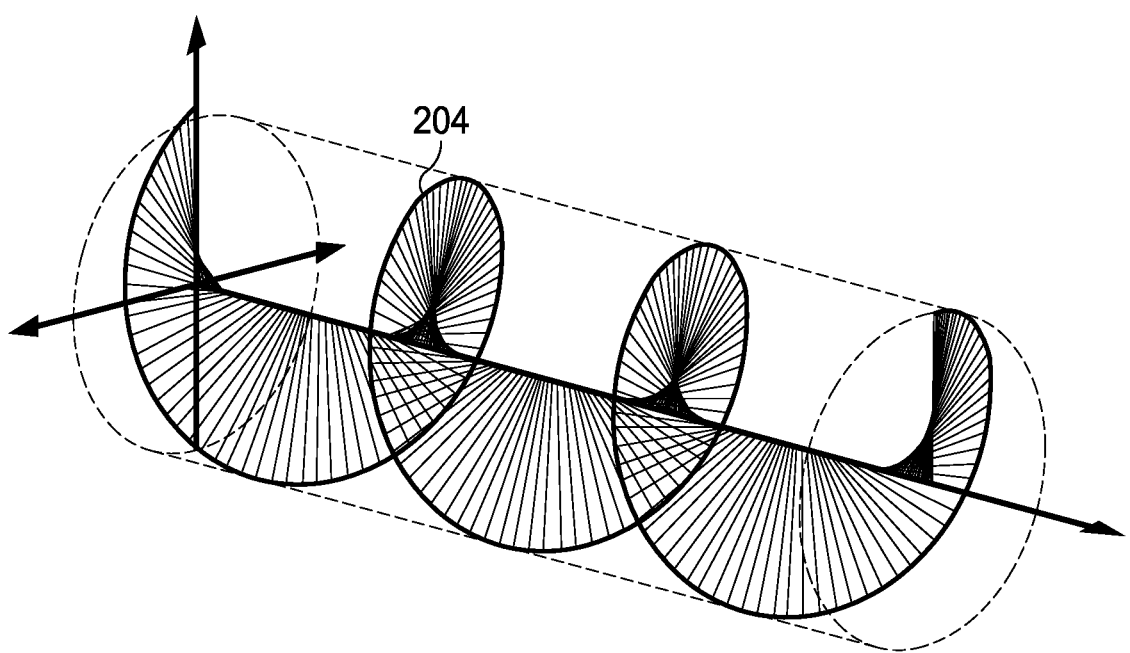
FIG. 2B illustrates an example of an electromagnetic wave is circular polarized.

FIG. 2B illustrates an example of an electromagnetic wave 204 that is circular polarized. In FIG. 2B, the electric intensity vector is rotates 360 degrees during a period, which is the minimum time interval for a 360 rotation.

Figure 2C:
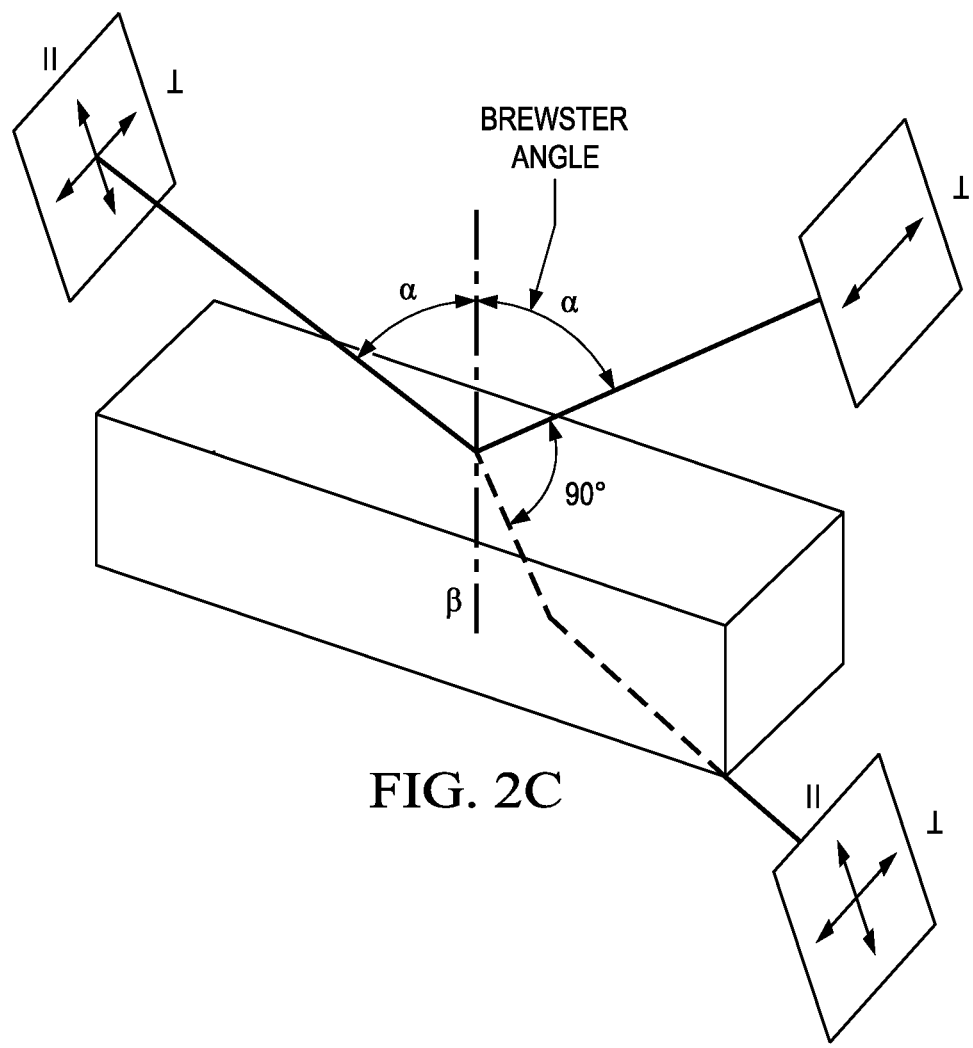

FIGS. 2C and 2D illustrate an example of an electromagnetic wave during a reflection the wave polarization in physical layer.

When reflected a polarized wave suffers a change in polarization as follows, therefore a wave which is not reflected will not suffer such changes. In FIG. 2C, a reflection coefficient for light which has electric field parallel to a plane of incidence goes to zero at angle between 0° and 90°. The reflected light at that angle is linearly polarized with its electric field vectors perpendicular to the plane of incidence and parallel to the plane of the surface from which it is reflecting. The angle at which this occurs is called the polarizing angle or the Brewster angle. At other angles, the reflected light is partially polarized. From Fresnel's equations, it can be determined that the parallel reflection coefficient is zero when the incident and transmitted angles sum to 90°. The use of Snell's law gives an expression for the Brewster angle. FIG. 2C shows an example where the reflection coefficients are different for waves parallel and perpendicular to the plane of incidence. FIG. 2C further shows when light is incident at the Brewster angle, the reflected light is linearly polarized because the reflection for the parallel component is 0. FIG. 2D shows that reflected intensity for rays parallel and perpendicular to the plane of incidence.

Figure 3A:
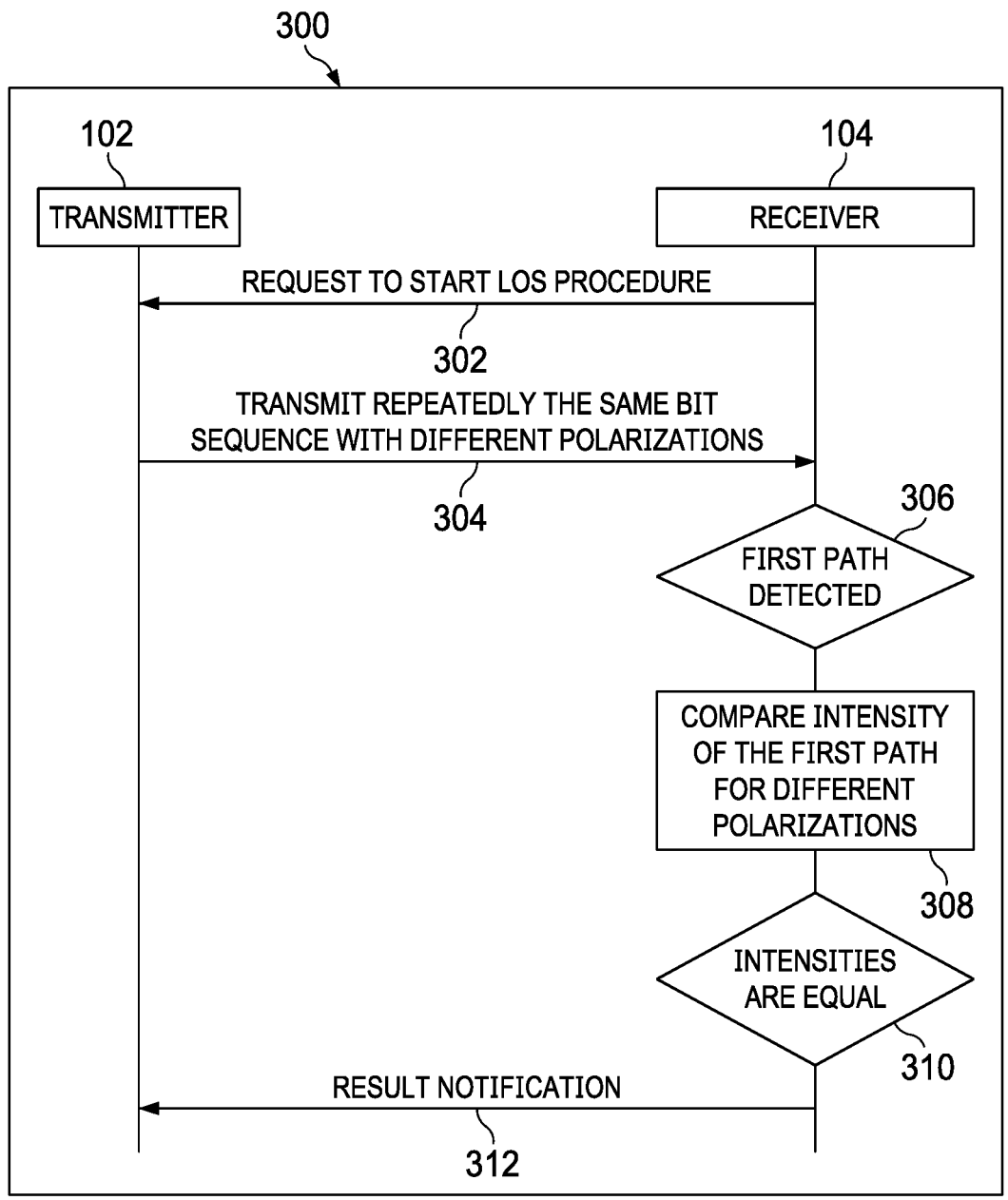
FIG. 3A illustrate example of a signal flow diagram of an embodiment of method for determining line of sight, according to the disclosure.

FIG. 3A illustrate example of a signal flow diagram 300 of an embodiment of method for determining line of sight, according to the disclosure. The method may be carried out in the context of the system as illustrated in FIG. 1A or in FIG. 1B, and may use the linear polarized or the circular polarized as an example as illustrated in FIG. 2A or 2B.

In Step 302, the receiver 104 requests the transmitter 102 to start the procedure of LOS determination via sending a LOS determination request to the transmitter 102. The LOS determination request may include one or more of a number of transmissions to the receiver 104, and a number of polarizations available at the receiver 104. The number of transmissions to the receiver 104, and the number and the directions of polarizations of the receiver 104 may also be pre-established via a known definition of the protocol or standard.

In step 304 the transmitter 102 sends successively, during a single frame transmission or in separate frames transmissions, of the same sequence of bits in wave signals at different polarizations. It is understood that the transmission could be in response to a prior request (such as the request in Step 302) sent by the receiver to the transmitter. Such prior request (such as the request in Step 302) could contain the number and the directions of polarizations to be sent by the transmitter 102. The transmission at different polarizations could be achieved in different ways, such as two dipole antennas oriented orthogonally to each other.

For a single frame transmission, the data transmitted by the transmitter 102 comprises multiple repetitions (or copies) of the same sequence of bits, and each repetition corresponds to one polarization of the polarizations. The number of repetitions may be referred to the number of polarizations in the LOS determination request, or may be referred predefined number agreed between the receiver 104 and the transmitter 102. For multiple frame transmissions, each frame transmission is sent at different polarization. In one embodiment, the transmitter 104 indicates, for instance in the preamble of its transmission (first part of the transmission), the number of sequence bits repetitions and the polarizations corresponding to each sequence bits repetitions that will follow in the transmission.

It is further understood that in some embodiments of step 304, the transmitter 102 transmits the same signal wave or the same sequence bit at least twice with different polarizations at the same power and to same direction.

The number of times sending the same signal wave or the same sequence bit may be called the number of transmission, the number of times sending the same signal wave or the same sequence bit may refer to the number of transmission in LOS determination request.

In step 306 the receiver 104 measures the power of the first received copy from the plurality of polarization.

In the example of NLOS multi-path channel propagation, each path corresponds to one copy (also means reflection) of the transmitted signal wave. The receiver 104 receives multiple copies for each transmission because the propagation between the transmitter and the receiver is done through multiple paths. In some examples, each path corresponds to one or multiple reflections of the electromagnetic wave. Therefore, in the case of multipath channel propagation, for each transmission from the transmitter, the receiver might receive multiple copies of the transmission (due to the reflections in the environment). For the LOS communication, the first received path (which is also the shortest path) corresponding to the LOS communication, and the other multiple adjacent paths are corresponding to the reflections.

After the receiver 104 measures (or detects) the first received path (through the received signal) for each transmission, the receiver 104 obtains and compares the intensity of each detected the first received copy for the plurality of transmissions, the first received copy is the received copy via the first received path.

For example, the transmitter sends the same bit sequence for two times, each time with 2 polarizations. The two times corresponds to two transmission. The first transmission for the same bit sequence with two polarizations (polarization A and polarization B. the second transmission for the same bit sequence with two polarizations (polarization C and polarization D). The receiver 104 may detect a first path for the first transmission from a path of the polarization A and a path of the polarization B. The receiver 104 may detect a first path for the second transmission from a path of the polarization C and a path of the polarization D. As an example, the first path for the first transmission is the path of the polarization A, and the first path for the second transmission is the path of the polarization C.

In step 308 the receiver 104 determines whether the intensities (or the powers) of each first received copy are equal. If the intensities (or the power) of each first received copy of the plurality of transmissions for each polarization are equal (or less than a threshold value), the transmission between the receiver 104 and the transmitter 102 may be LOS, and otherwise the transmitter 102 is NLOS.

For example, the receiver 104 determines whether the intensities of the polarization A and the polarization C are equal.

For the signal wave transmitted with circular polarization case (such as the example represented in FIG. 2B), the received wave signal has the same intensity during a complete rotation of the vector E for LOS waves. While for NLOS reflections, there is a variation of the intensity depending on the particular reflection (orientation of the reflection surface). Therefore for the circular polarization transmission, the receiver 102 will compare the intensity variation of the received wave signal and if there is (or approximately) constant intensity in the received wave the propagation, the communication between the transmitter 102 and the receiver 104 may be LOS communication. To reduce the likelihood for a LOS determination error the method could be combined with a successive receive/transmit beamformed as below.

In step 310 the receiver 104 notifies the determination result to the transmitter 102.

In this example, the receivers 104 determines whether the communication between the receiver 104 and the transmitter 102 is LOS based on the intensities of each copies of the wave signal. So that the procedures which will use the result, such as determination of a distance between the receiver 104 and the transmitter 102, can be sure, to avoid the error for the procedures.

In an embodiment, when the communication between the receiver 104 and the transmitter 102 is changed from LOS to NLOS, the device (which may be the receiver 104 or the transmitter 102) may decide to handover (start new communication) to a different device or access point (AP or base stations). So that the device can perform LOS communication. For this purpose, the device (which may be the receiver 104 or the transmitter 102) will periodically asses if there are neighboring devices (AP, BS) that could communicate in LOS to switch if the current LOS communication fails or become NLOS. This LOS based handover can be used to obtain a higher quality of communication (reduced pathloss), or to allow a precise tracking of the location of the device.

The LOS determination could also allow the remote operation of the device (which may be the receiver 104 or the transmitter 102) for instance a drone, and decide the change of trajectory to maintain the LOS status of the communication.

In a different embodiment, detection of LOS can be done simultaneously with multiple receivers 104. For instance the transmitter 102 sends the same wave signal at different polarizations to multiple receivers and then request each receiver report whether the communications between the receivers 102 and the transmitter 104 are LOS communication. Or the transmitter sends the same wave signal at different polarizations and then allows the LOS receiver to compete for channel access via a random access channel procedure.

In a different embodiment, the devices could record the NLOS or LOS information as function of location and use it for accessing or discovery of a base station or a point, or use the NLOS or LOS information for performing an access point discovery, or use the NLOS or LOS information for fast beamforming. For instance in order to minimize the discovery delay, the beamforming scanning could start with the LOS directions and then search around the LOS direction if the LOS direction becomes obstructed.

Figure 3B:
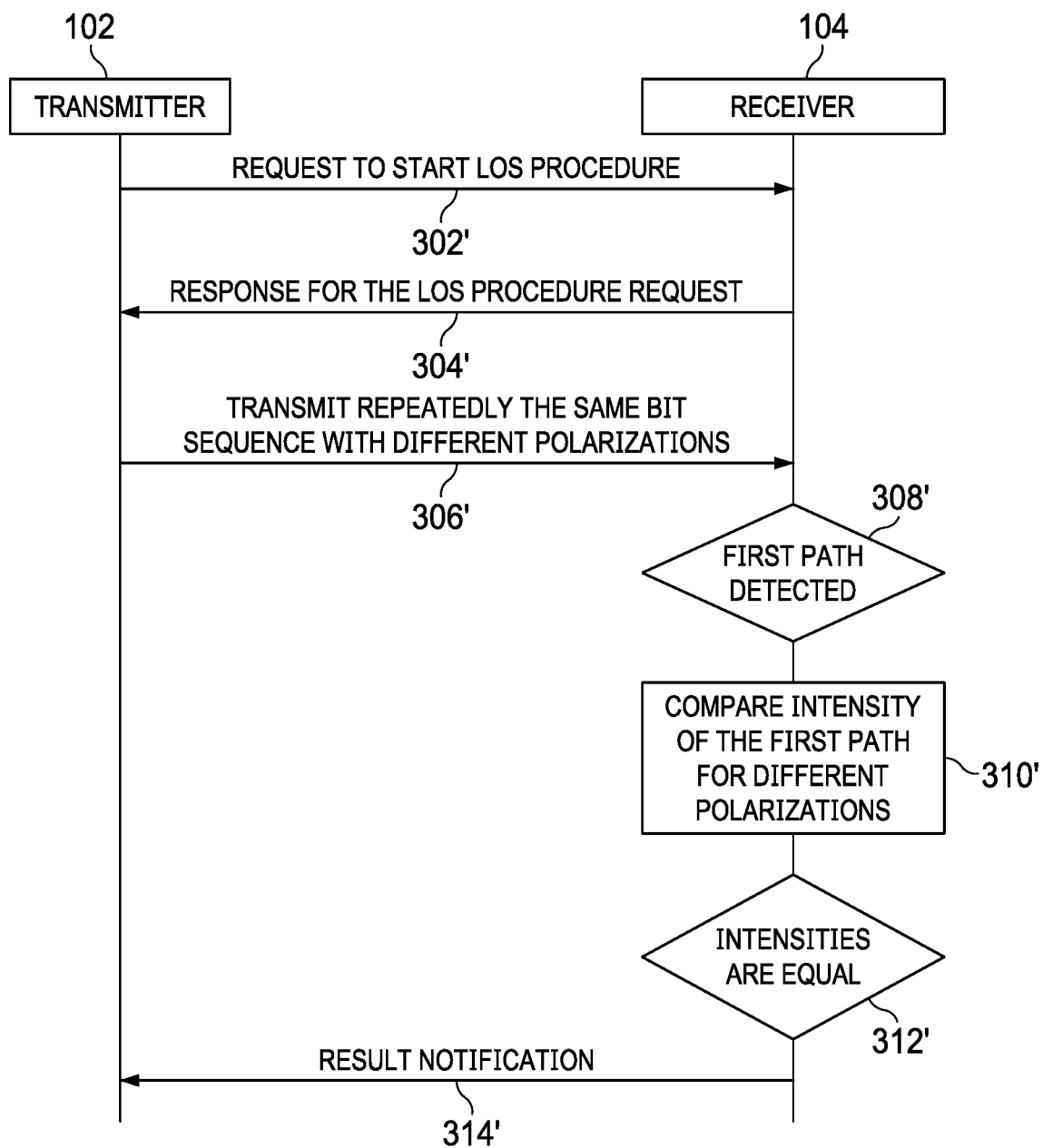
FIG. 3B illustrate example of a signal flow diagram of an embodiment of method for determining line of sight, according to the disclosure.

FIG. 3B illustrate example of a signal flow diagram of an embodiment of method for determining line of sight, according to the disclosure. The method may be carried out in the context of the system as illustrated in FIG. 1A or in FIG. 1B, and may use the linear polarized or the circular polarized as an example as illustrated in FIG. 2A or 2B.

In FIG. 3B, it is the transmitter 102 initiates the request to start LOS procedure. That is, the transmitter 102 sends the LOS determination request to the receiver 104. And the LOS determination request in step 302' comprises one or more of a number of transmissions of the transmitter 102, and a number of polarizations of the transmitter 102. And then in step 304', the receiver 104 sends a response to the transmitter 102. The response in step 304' may comprise the indication of confirmation starting the LOS procedure. Or the response in step 304' may comprise one or more of a number of transmissions of the receiver 104, and a number of polarizations of the receiver 104.

The steps from 306' to 314' in FIG. 3B correspond to the steps from 304 to 312 in FIG. 3A.

Figure 3C:
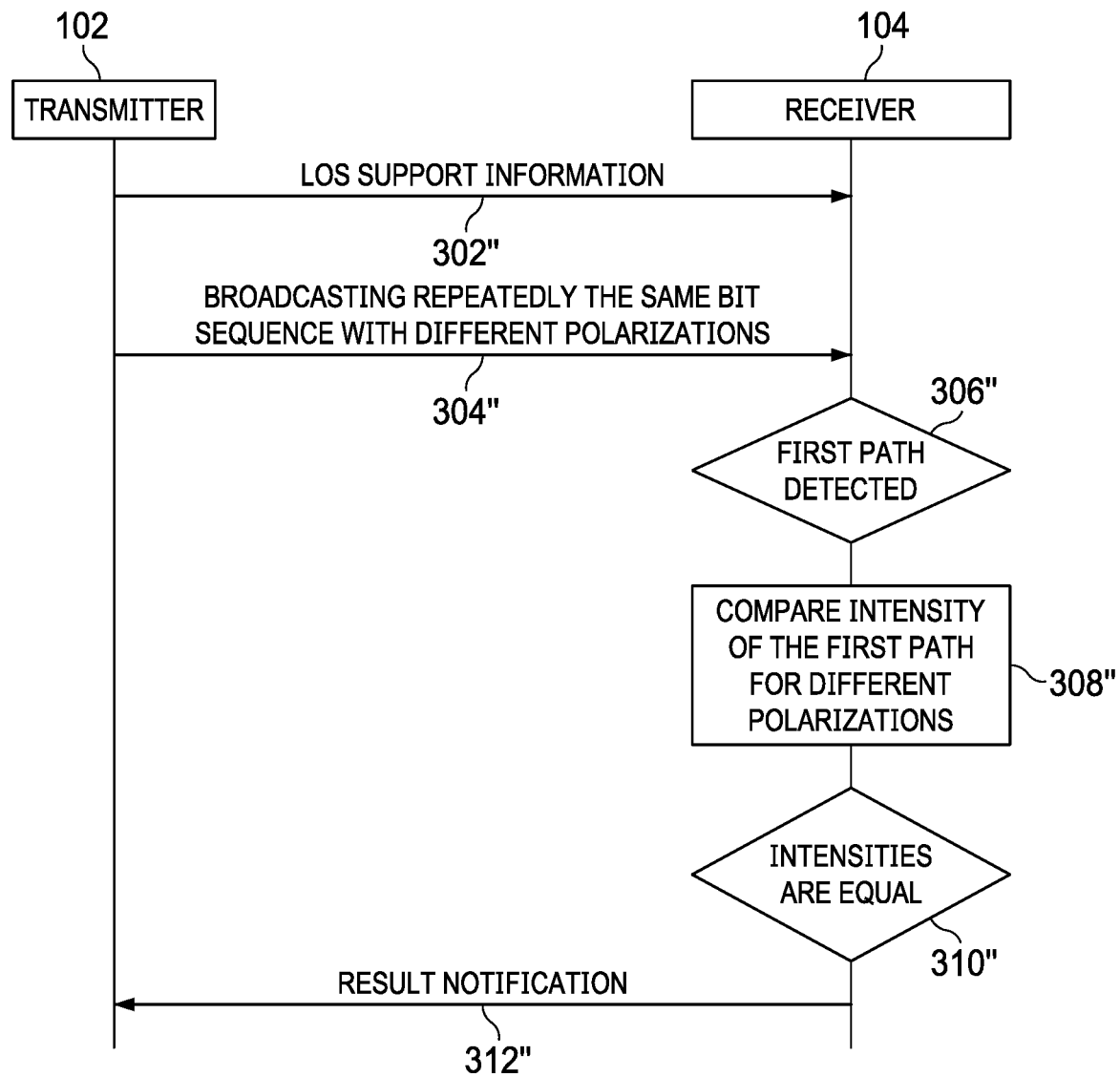
FIG. 3C illustrate example of a signal flow diagram of an embodiment of method for determining line of sight, according to the disclosure.

FIG. 3C illustrate example of a signal flow diagram of an embodiment of method for determining line of sight, according to the disclosure. The method may be carried out in the context of the system as illustrated in FIG. 1A or in FIG. 1B, and may use the linear polarized or the circular polarized as an example as illustrated in FIG. 2A or 2B.

In FIG. 3C, it is the transmitter 102 initiates the request to start LOS procedure. That is, the transmitter 102 broadcasts the LOS determination request to the receiver 104. And the LOS determination request in step 302" comprises one or more of the number of transmissions of the transmitter 102, and a number of polarizations of the transmitter 102. And then, the transmitter broadcasting, during a single transmission or in separate transmissions, a wave signal comprising the same sequence of bits with different polarization.

The steps from 306" to 312" in FIG. 3C are the same as the steps from 306 to 312 in FIG. 3A, and will not introduce at here.

Before the step 302, 302' and 302", the receiver 104 send a LOS determining request to the transmitter 102, the transmitter 102 and the receiver 104 may perform confirmation to confirm both of the transmitter 102 and the receiver 104 support a procedure of LOS determination. The confirmation procedure may be performed via exchanging messages between the receiver 104 and the transmitter 102, or broadcasting messages by the transmitter 102 and the receiver 104.

The message indicating the receiver 104 or the transmitter 102 supports the LOS determination may be an enhanced directional multi-gigabit (EDMG) beam refinement protocol (BRP) request, and the enhanced DMG beam refinement protocol (EDMG BRP) request comprises an element indication the device (which may be the receiver 104 or the transmitter 102) sending EDMG BRP request support LOS determination.

As an example, the EDMG request may comprise the following element in table 1:

TABLE 1

| B0 B7 Element ID | B8 B15 Length | B16 B23 Element ID Extension | B24 B31 L-RX | B32 B39 L-TX-RX | B40 B50 TX Sector ID | B51 B52 EDMG TRN-Unit P | B53 B56 EDMG TRN-Unit M | B57 B58 EDMG TRN-Unit N |
|---|---|---|---|---|---|---|---|---|
| Bits: 8 | 8 | 8 | 8 | 8 | 11 | 2 | 4 | 2 |

| B59 TXSS-REQ | B60 TXSS-REQ-RECIPROCAL | B61 B69 TXSS-SECTORS | B70 B75 BRP CDOWN | B76 B83 TX Antenna Mask | B84 First Path Training | B85 LOS Training | B86 B87 |
|---|---|---|---|---|---|---|---|
| Bits: 1 | 1 | 9 | 6 | 8 | 1 | 1 | 3 |

Where, the first path training element represents the device (which may be the receiver 104 or the transmitter 102) sending EDMG BRP request supports the first path training procedure. Which means the device support to determine which path is the shortest path among all the path sending different copies of the same sequence of bits. Each copy correspond to one polarization.

The LOS training element represents the first device (which may be the receiver 104 or the transmitter 102) sending the EDMG BRP request supports LOS determination procedure described in FIGS. 3A-3C.

In another example, the first path training element may be included in the header of the EDMG BRP request, or may be included in a text.

As another example, the packet of the EDMG BRP request may be as the following format in table 2:

TABLE 2

| | B1 Initiator | B2 B9 L-RX | B10 TX-FBCK-REQ | B11 TX-Train-Response | B12 RX-Train-Response | B13 TX-TRN-OK | B14 TXSS-FBCK-REQ |
|---|---|---|---|---|---|---|---|
| bits: | 1 | 8 | 1 | 1 | 1 | 1 | 1 |

| | B15 B26 TX sector ID | B27 B38 Best Sector FB | B39 B41 Best-FBCK Antenna Id | B42 MID Extention | B43 BRP-TXSS-OK | B44 B48 L-RX-TX | B49 B50 TRN-U P | B51 B54 TRN-U M |
|---|---|---|---|---|---|---|---|---|
| bits: | 12 | 12 | 3 | 1 | 1 | 5 | 2 | 4 |

| | B55 B56 TRN-U N | B57 TXSS-REQ | B58 TXSS-REQ-RECIPROCAL | B59 B67 TXSS-SECTORS | B68 B73 BRP CDOWN | B74 B81 TX Antenna Mask | B82 First Path Training | B83 LOS Training | B84 B88 Reserved |
|---|---|---|---|---|---|---|---|---|---|
| bits: | 2 | 1 | 1 | 9 | 6 | 8 | 1 | 1 | 5 |

If the receiver 104 and transmitter 102 confirm both of the transmitter 102 and the receiver 104 support a procedure of LOS determination via the EDMG BRP request, the packet comprises an indication of the copy should be used for First Path BF training.

Where, the element of First Path Training may be set to 1, indicates that the TRN field appended to this packet should be used for First Path BF training. The element of First Path Training may be set to 0 to indicate that the TRN field appended to this packet should be used for best performance BF training.

The element of LOS training may be set to 1, indicates that the TRN field appended to this packet should be used for LOS beamforming (BF) training. When the element of LOS training set to 0 to indicate that the TRN field appended to this packet is not used for the LOS BF.

In the EDMG BRP request, if the first device sending the EDMG BRP request supports the LOS determination procedure, both the element of first path training and the element of LOS training should be set to 1. Or the first device sending the EDMG BRP request does not support the LOS determination procedure.

After a second device (which may be the transmitter 102 or the receiver 104) receiving the EDMG BRP request, the second device (which may be the transmitter 102 or the receiver 104) receiving the EDMG BRP request may send a response to the first device sending the EDMG BRP request to indicate that the second device (which may be the transmitter 102 or the receiver 104) receiving the EDMG BRP request supports the LOS determination procedure. The second device (which may be the transmitter 102 or the receiver 104) may also send the EDMG BRP request to the first device to indicate that the second device also supports the LOS determination procedure.

Any of the response from the second device and the EDMG BRP request from the second device need to comprise the indication the device (the first device or the second device) supports the LOS determination procedure.

In other example, if the receiver 104 and transmitter 102 confirm both of the transmitter 102 and the receiver 104 support the Dual polarization TRN procedure via the message, the packet comprises an indication to use the First Path BF training.

Where, the element of First Path Training may be set to 1, indicates that the TRN field appended to this packet should be used for First Path BF training. The element of First Path Training may be set to 0 to indicate that the TRN field appended to this packet should be used for best performance BF training.

The element of LOS training may be set to 1, indicates that the TRN field appended to this packet should be used for LOS beamforming (BF) training. When the element of LOS training set to 0 to indicate that the TRN field appended to this packet is not used for the LOS BF.

In the EDMG BRP request, if the first device sending the EDMG BRP request supports the LOS determination procedure, both the element of first path training and the element of LOS training should be set to 1. Or the first device sending the EDMG BRP request does not support the LOS determination procedure.

After a second device (which may be the transmitter 102 or the receiver 104) receiving the EDMG BRP request, the second device (which may be the transmitter 102 or the receiver 104) receiving the EDMG BRP request may send a response to the first device sending the EDMG BRP to indicate that the second device (which may be the transmitter 102 or the receiver 104) receiving the EDMG BRP request supports the LOS determination procedure. The second device (which may be the transmitter 102 or the receiver 104) may also send the EDMG BRP request to the first device to indicate the second device also support the LOS determination procedure.

Any of the response from the second device and the EDMG BRP request from the second device need to comprise the indication the peer device the LOS determination procedure.

Figure 5:
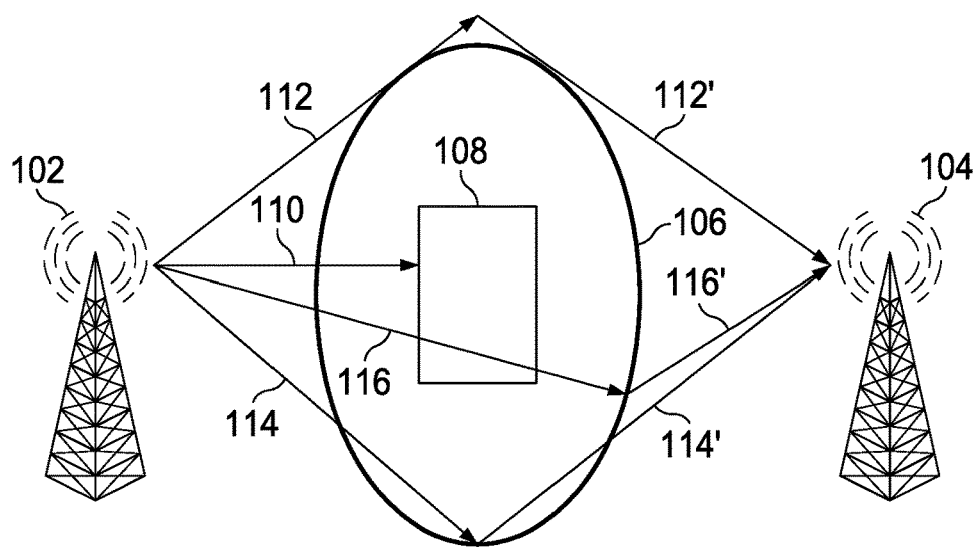
FIG. 5 illustrate example of a communication system 100 in the case of which the propagation between transmitter 102 and receiver 104 is as the non-line of sight (NLOS) with a cylindrical reflection surface with obstructed LOS, a and the communication system 100 that may be used for implementing the devices and methods disclosed herein.

FIG. 5 illustrate example of a communication system 100 in the case of which the propagation between transmitter 102 and receiver 104 is as the non-line of sight (NLOS) with a cylindrical reflection surface with obstructed LOS, the communication system 100 that may be used for implementing the devices and methods disclosed herein.

That is each repetition (copy) at any polarization will suffer similar reflection, so at the receiver 104, the first received copies for each transmission will have the same intensity no matter the transmitter polarization. If the transmission by the transmitter 102 and reception by the receiver 104 is omni directional, the receiver will always receive the same wave signal no matter polarization at the transmitter because of the symmetry of this construction.

However if the receiver 104 does a beamforming receiving, in other words, if the receiver 104 receives from limited spatial directions (for instance a 3D solid angle), the ToF will be the same. The intensity of the first received ray (first received copy) will change with the polarization wave at the transmitter 102. The receiver 104 concludes that the propagation is NLOS.

Therefore, as an example of the disclosure, the receiver 104 may repeat beamformed receiving for different spatial directions (and therefore potentially suffering different reflections) while the transmitter 102 will change the polarizations of transmitted waves. If a spatial direction is found that it is invariant to the polarization that spatial direction will be considered LOS. In an alternative embodiment the transmitter 104 sends beamformed waves in different directions, with multiple (different) polarizations for the same direction, while the receiver 104 observes the first received wave intensity with respect to polarization changes. The addition of beamformed transmission of different polarizations to the above LOS procedure can be done for instance after the LOS is determined as an additional step to verify the LOS. The beamformed transmission also may be performed during the LOS procedure itself when polarizations and beamformed beams are combined to determine when and if the first received copy is invariant with respect to polarizations, which happens only in LOS.

Figure 6A:
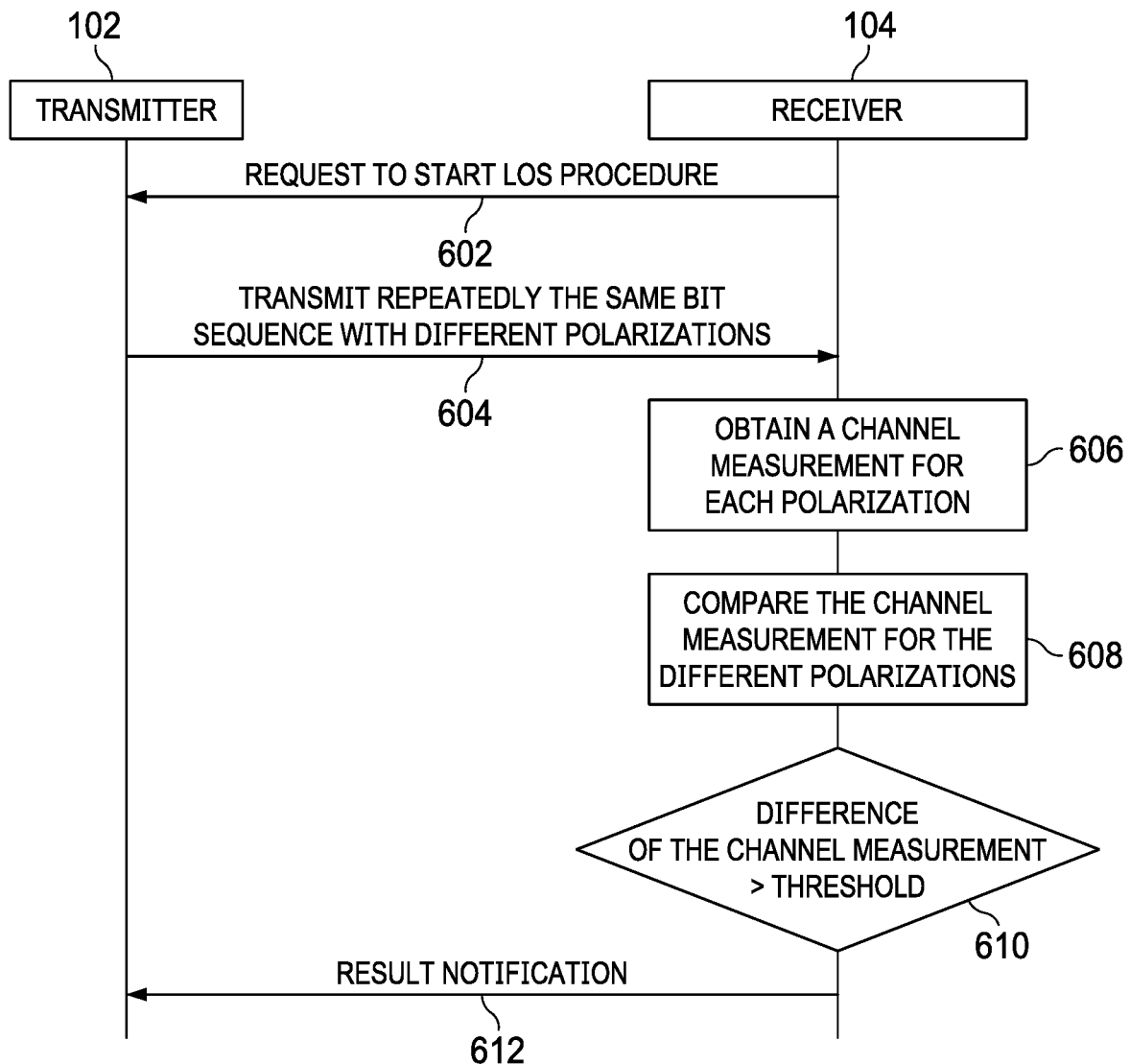
FIG. 6A illustrate example of a signal flow diagram of an embodiment of method for determining line of sight, according to the disclosure.

FIG. 6A illustrate example of a signal flow diagram of an embodiment of method for determining the line of sight, according to the disclosure. The method may be carried out in the context of the system as illustrated in FIG. 1A or in FIG. 1B, and may use the linear polarized or the circular polarized as an example as illustrated in FIG. 2A or 2B.

Step 602. The receiver 104 requests the transmitter 102 to start the procedure of LOS determination via sending a LOS determining request to the transmitter 102. The LOS determining request may include an indication whether a dual polarization procedure for LOS is used, the dual polarization means the number of different polarization for each direction is two. Same sequence is sent twice in the same direction with different polarizations—for instance two orthogonal polarizations.

If the indication is that the dual polarization procedure for LOS is used, the transmitter 102 should send a same sequence of bits in wave signals at two different polarizations. If the indication is that the dual polarization procedure for LOS is not used, the transmitter 102 sends the sequence of bits in wave signals not at two polarizations. FIG. 6A as an example of which the dual polarization procedure for LOS is used.

Step 604. The transmitter 102 sends, the same sequence of bits in wave signals at different polarizations. Such sequence in 802.11ay is called TRN (training) sequence and is sent to a direction in space. Where the transmission may be in response to a prior LOS determining request comprising the indication of which the dual polarization procedure for LOS is used. Transmission at different polarizations could be achieved in different ways such as two dipole antennas oriented orthogonally to each other on parallel with the surface of earth and one perpendicular.

For a single frame transmission, the data transmitted by the transmitter 102 comprises multiple repetitions (copies) of the same sequence of bits, and each repetition (copies) corresponds to a polarization of the polarizations.

Before the transmitter 102 transmits the wave signal comprising the same sequence of bits to the receiver 104, the transmitter 102 notifies the TRN power for each of the polarizations. The transmitter 102 may transmit the same signal wave at the same power for the different polarizations, or the transmitter 102 may also transmit the same signal wave at the different power for the different polarizations.

Step 606. The receiver 104 obtains a channel measurement for each polarization.

The channel measurements obtained by the receiver 104 may refers to table 3, the Channel Measurement for the First Path and Dual Polarization TRN enabled. For each polarization, the channel measurements comprises a Relative I Component Tap #1 Polarization #1, and a Relative Q Component Tap #1 Polarization #1. The Relative I Component Tap #1 Polarization #1 instructs the in-phase component of impulse response for Tap #1 (corresponding to the shortest delay), and polarization #1 in Dual Polarization TRN. The a Relative Q Component Tap #1 Polarization #1 instructs an in-quadrature component of impulse response for Tap #1 (corresponding to the shortest delay), and polarization #1 in the Dual Polarization TRN.

If the Dual Polarization TRN procedure is not combined with the First Path procedure, the receiver may feedback to the transmitter measurements for more than a single tap (first path) as presented in the Table 3.

In the example of Dual polarization TRN, the transmitter 102 sends the wave signal comprising the same sequence of bits at two polarizations. Therefore, the receiver 104 obtains the Relative Q Component and the Relative I Component for the two polarizations. In other examples of Dual polarization TRN, the transmitter 102 sends the wave signal comprising the same sequence of bits at two different polarizations via the multiple path channel, the receiver 104 obtains the Relative Q Component and the Relative I Component for each path of each of the two polarizations.

TABLE 3

| Field | | Size | Meaning |
|---|---|---|---|
| Dual Polarization TRN Measurement | Relative I Component Tap #1 Polarization #1 | 8 bits | The in-phase component of impulse response for Tap #1 (shortest delay), and polarization # 1 in Dual Polarization TRN |
| | Relative Q Component Tap #1 Polarization #1 | 8 bits | The in-quadrature component of impulse response for Tap #1 (shortest delay), and polarization # 1 in Dual Polarization TRN |
| | Relative I Component Tap #1 Polarization #2 | 8 bits | The in-phase component of impulse response for Tap #1 (shortest delay), and polarization # 2 in Dual Polarization TRN |
| | Relative Q Component Tap #1 Polarization #2 | 8 bits | The in-quadrature component of impulse response for Tap #1 (shortest delay), and polarization # 2 in Dual Polarization TRN |

TABLE 3-continued

| Field | Size | Meaning |
| --- | --- | --- |
| Relative I Component Tap #2 Polarization #1 | 8 bits | The in-phase component of impulse response for Tap #2 ( ), and polarization # 1 in Dual Polarization TRN |
| Relative Q Component Tap #2 Polarization #1 | 8 bits | The in-quadrature component of impulse response for Tap #2 ( ), and polarization # 1 in Dual Polarization TRN |
| Relative I Component Tap #2 Polarization #2 | 8 bits | The in-phase component of impulse response for Tap #2 ( ), and polarization # 2 in Dual Polarization TRN |
| Relative Q Component Tap #2 Polarization #2 | 8 bits | The in-quadrature component of impulse response for Tap #2 ( ), and polarization # 2 in Dual Polarization TRN |
| . . . | | |
| Relative I Component Tap #N Polarization #1 | 8 bits | The in-phase component of impulse response for Tap #n ( ), and polarization # 1 in Dual Polarization TRN |
| Relative Q Component Tap #N Polarization #1 | 8 bits | The in-quadrature component of impulse response for Tap #N ( ), and polarization # 1 in Dual Polarization TRN |
| Relative I Component Tap #N Polarization #2 | 8 bits | The in-phase component of impulse response for Tap #N ( ), and polarization # 2 in Dual Polarization TRN |
| Relative Q Component Tap #N Polarization #2 | 8 bits | The in-quadrature component of impulse response for Tap #N (, and polarization # N in Dual Polarization TRN |

As the example presented by table 3, in the Dual polarization TRN, the transmitter 102 sends wave signal comprising the same sequence of bits at two polarizations, and each polarization have N path. The channel measurement for the N path in the two polarizations may refer to table 3. The Tap #1 represents the first path the receiver measured. The first path has the shortest delay.

Step 608. The receiver 104 compares the channel measurements for the two polarizations to obtain the channel measurement difference.

Step 610. The receiver 104 determines whether the channel measurement difference between the two polarization is larger than a threshold. If the channel measurement difference between the two polarization is larger than a threshold, the receiver 104 may determine that the transmission between the receiver 104 and the transmitter 102 is NLOS, otherwise the transmission is LOS.

If the transmitter 102 sends the same sequence of bits at two polarizations, and each polarization have multiple paths, the receiver 102 may compare the channel measurement of the first path of each of the two polarizations. If the channel measurement difference between the two polarization is larger than a threshold, the receiver 104 may determine that the transmission between the receiver 104 and the transmitter 102 is NLOS, otherwise the transmission may be LOS. The threshold is stored in the receiver 104. The threshold might be established beforehand or implementation specific. It needs to be sufficient to filter out the possible noise and measurement errors. If the radiated power at the TX for the two polarizations is different, the receiver needs to consider this difference in addition to the threshold.

Step 612. The receiver 104 may notify the determination result to the transmitter 102.

In this example, the receivers 104 determines whether the communication between the receiver 104 and the transmitter 102 is LOS based on the channel measurements for the two polarizations may make sure the determination result. So that the procedures which will use the result, such as determination of a distance between the receiver 104 and the transmitter 102, can be make sure, to avoid the error for the procedures.

In other example, the receiver 104 may not perform the steps 608 to 612, and sends the channel measurement for each polarization to the transmitter 102. The transmitter 102 here receiving the channel measurement for each polarization compares the channel measurements for the two polarizations, and determines whether the channel measurement difference for the two polarization is larger than a threshold. If the channel measurement difference for the two polarization is larger than a threshold, the transmitter 102 may determine that the transmission between the receiver 104 and the transmitter 102 is NLOS, otherwise the transmission is LOS In an embodiment, when the communication between the receiver 104 and the transmitter 102 is changed from LOS to NLOS, the device (which may be the receiver 104 or the transmitter 102) may decide to handover (start new communication) to a different device or access point (AP or base stations). So that the device can perform LOS communication. For this purpose, the device (which may be the receiver 104 or the transmitter 102 will periodically asses if there are neighboring devices (AP, BS) that could communicate in LOS to switch if the current LOS communication fails or become NLOS. This LOS based handover can be used to obtain a higher quality of communication (reduced path loss), or to allow a precise tracking of the location of the device.

Figure 6B:
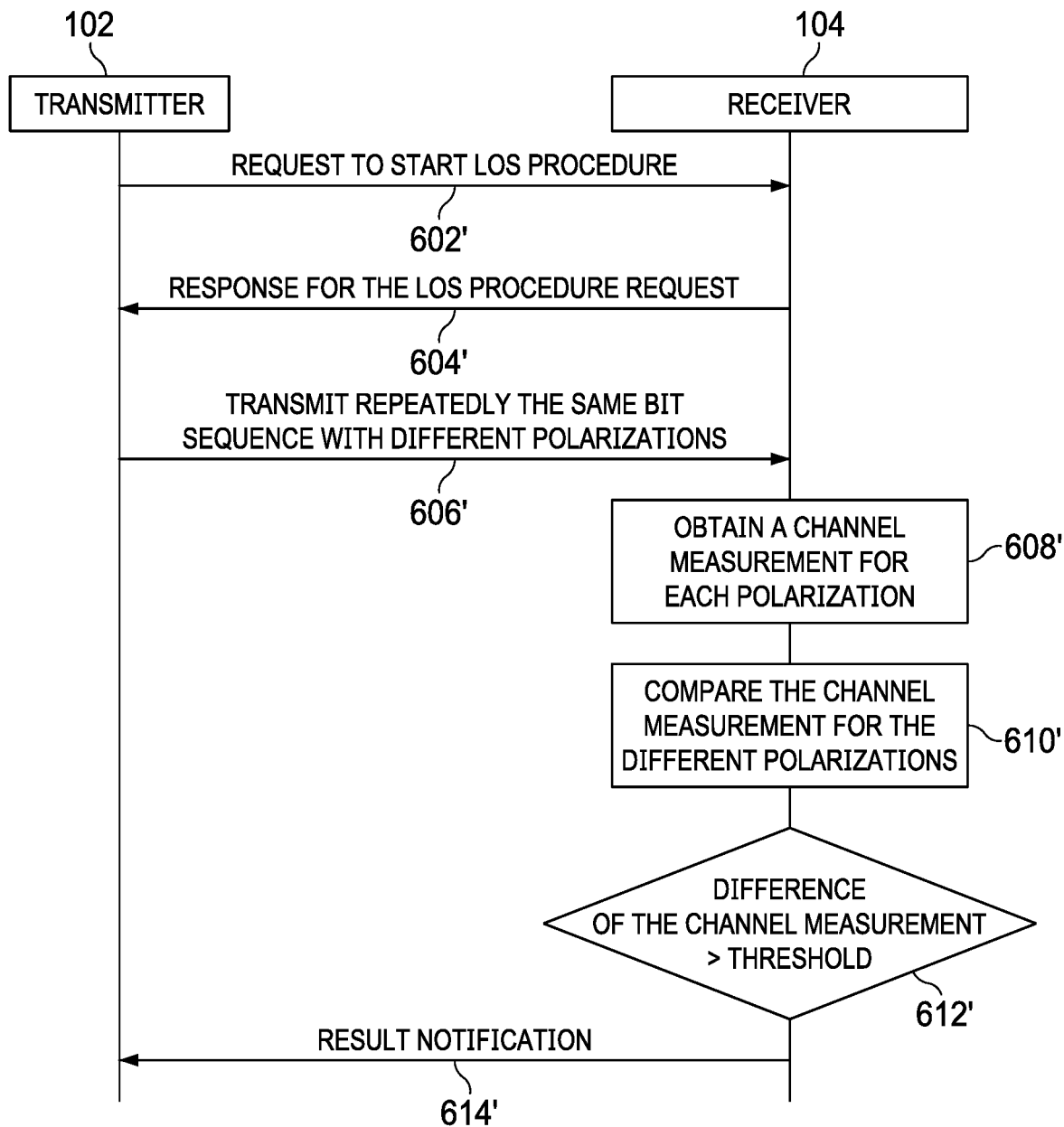
FIG. 6B illustrate example of a signal flow diagram of an embodiment of method for determining line of sight, according to the disclosure.

FIG. 6B illustrate example of a signal flow diagram of an embodiment of method for determining line of sight, according to the disclosure. The method may be carried out in the context of the system as illustrated in FIG. 1A or in FIG. 1B, and may use the linear polarized or the circular polarized as an example as illustrated in FIG. 2A or 2B.

In FIG. 6B, it is the transmitter 102 initiates the request to start LOS procedure. That is, the transmitter 102 sends a LOS determination request to the receiver 104. The LOS determination request in step 602' comprises the indication whether a dual polarization procedure for LOS is used. And then in step 604', the receiver 104 sends a response to the transmitter 102. The response in step 604' may comprise the indication of confirmation starting the LOS procedure by using the dual polarization procedure.

The steps from 606' to 614' in FIG. 6B as same as the steps from 604 to 612 in FIG. 6A, and will not introduce at here.

Figure 6C:
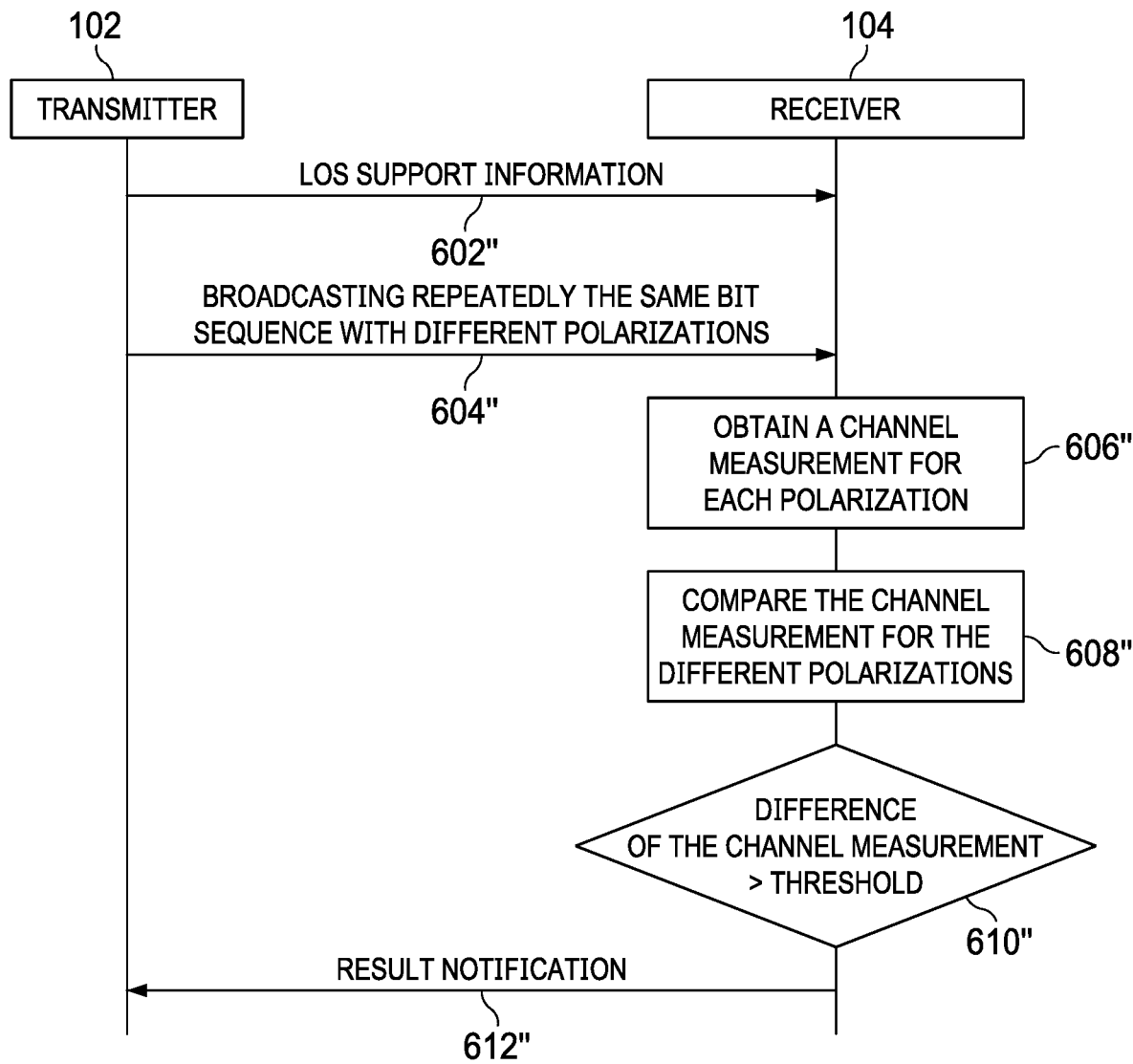
FIG. 6C illustrate example of a signal flow diagram of an embodiment of method for determining line of sight, according to the disclosure.

FIG. 6C illustrate example of a signal flow diagram of an embodiment of method for determining line of sight, according to the disclosure. The method may be carried out in the context of the system as illustrated in FIG. 1A or in FIG. 1B, and may use the linear polarized or the circular polarized as an example as illustrated in FIG. 2A or 2B.

In FIG. 6C, it is the transmitter 102 initiates the request to start LOS procedure. That is, the transmitter 102 broadcasts a LOS determination request to the receiver 104. The LOS determination request in step 602' comprises an indication of which the dual polarization procedure for LOS is used. And then, the transmitter broadcasting, during a single transmission or in separate transmissions, the same sequence of bits with different polarization.

The steps from 606" to 612" in FIG. 3C are the same as the steps from 606 to 612 in FIG. 6A, and will not introduce at here.

In other example, the receiver 104 may not perform the steps 608 to 612 in FIG. 6A, or not perform the steps 610' to 614' in FIG. 6B, or not perform the steps 608" to 612" in FIG. 6C, and sends the channel measurement for each polarization to the transmitter 102 after obtaining the channel measurements for each polarization. The transmitter 102 compares the channel measurements of the two polarizations, and determines whether the channel measurement difference between the two polarizations is larger than a threshold. If the channel measurement difference between the two polarizations is larger than a threshold, the transmitter 102 may determine that the transmission between the receiver 104 and the transmitter 102 is NLOS, otherwise the transmission is LOS.

Before the step 602, the receiver 104 send a Dual Polarization request to the transmitter 102, the transmitter 102 and the receiver 104 may perform confirmation to confirm both of the transmitter 102 and the receiver 104 support a procedure of Dual Polarization TRN Measurement. The confirmation procedure may be performed via exchanging messages between the receiver 104 and the transmitter 102, or broadcasting messages by the transmitter 102 and the receiver 104.

The LOS determination request indicating whether the dual polarization procedure for LOS is used may be the Enhanced DMG Beam Refinement Protocol (EDMG BRP) request. The EDMG BRP request comprises a dual polarization TRN field. The dual polarization TRN field indicates whether the device (which may be the receiver 104 or the transmitter 102) sending EDMG BRP request requests for the Dual Polarization TRN.

As an example, the EDMG BRP request may comprise the following element in table 4:

TABLE 4

| B0 B7 Element ID | B8 B15 Length | B16 B23 Element ID Extension | B24 B31 L-RX | B32 B39 L-TX-RX | B40 B50 TX Sector ID | B51 B52 EDMG TRN-Unit P | B53 B56 EDMG TRN-Unit M | B57 B58 EDMG TRN-Unit N |
|---|---|---|---|---|---|---|---|---|
| Bits: 8 | 8 | 8 | 8 | 8 | 11 | 2 | 4 | 2 |
|  | B59 | B60 | B61 B69 | B70 B75 | B76 B83 | B85 | B86 Digital BF request | B87 Dual polarization TRN |
| Bits: |  |  |  |  |  |  | 1 | 1 |

Where, the Dual polarization TRN element (the element may also be a field) in table 4 indicates whether the first device (which may be the receiver 104 or the transmitter 102) sending EDMG BRP request supports the Dual polarization TRN training procedure. The Dual polarization TRN element in table 4 may also be the indication whether a dual polarization procedure for LOS is used. If the Dual Polarization TRN element is set to 1, the Dual Polarization TRN element indicates a second device receiving the BRP request to send the repetitions of TRN sequences with different polarizations for the same AWV (beamform). That is the first device sending the EDMG BRP requests for the Dual Polarization TRN, the dual polarization procedure is used. If the Dual Polarization TRN element is set to 0, the Dual Polarization TRN element indicates that the TRN (Training sequence) shall be sent without polarization change per each AWV, which means that the TRN should be sent 1 polarization. That is that the device sending the EDMG BRP does not request for the Dual Polarization TRN, and the dual polarization procedure is not used.

The Dual polarization TRN element indicates whether the first device (which may be the receiver 104 or the transmitter 102) sending the EDMG BRP request requests the dual polarization procedure described in FIGS. 6A-6C.

In another example, the Dual polarization TRN element may be included in the header of the EDMG BRP request.

In other example, the indication whether a dual polarization procedure is used may be included in RXVECTOR parameters, or be included in TXVECTOR parameters. The RXVECTOR parameters are received by the receiver 104, and the RXVECTOR parameters present a PHY interaction during receiving of various PPDU formats. The RXVECTOR parameters are parameters for the receiver 104. The TXVECTOR parameters are parameters for the transmitter 102. The TXVECTOR parameters present a PHY interaction during transmitting of the various PPDU formats.

The indication whether a dual polarization procedure for LOS is used included by the RXVECTOR parameters or included by the TXVECTOR parameters may refer to table 5.

TABLE 5

| DUAL POLARIZATION_TRNS | FORMAT is EMDG | When set to 1, which indicates that the TRN field appended to this packet comprising the TRN shall have different polarizations per same AWV (beamform). When set to 0, which indicates the TRN field appended to this packet comprising the TRN are without polarization change per each AWV (beamform) | Y | Y |
|---|---|---|---|---|

The DUAL POLARIZATION_TRNS element in the RXVECTOR parameters or in the TXVECTOR parameters, instructs whether the TRN field appended to this packet has at least two different polarizations for each beamform (AVW). If the DUAL POLARIZATION_TRNS element in the RXVECTOR parameters or in the TXVECTOR parameters is set to 1, it indicates that the TRN field appended to the packet comprising the TRN has different polarizations for each beamform. If the DUAL POLARIZATION_TRNS element in the RXVECTOR parameters or in the TXVECTOR parameters is set to 0, it instructs that the TRN field appended to the packet has one polarization.

In other example, the indication whether a dual polarization procedure for LOS is used may be included in an EMDG-Header-A field. The EMDG-Header-A field is a field structure and definition for a SU PPDU. The indication whether a dual polarization procedure for LOS included in the EMDG-Header-A field may be a Dual Polarization TRN training element which may refer to table 6 as follows:

TABLE 6

| Dual Polarization TRN Training | 1 | 48 | When set to 1, and field Number of spatial streams (SS) equals 0 indicates that the TRN field sequences appended to this packet have different polarization for the same sector (AWV). When set to 0 and field Number of SS equals 0 indicates that TRN field sequences appended to this packet are without polarization change per each AWV (beamform). This field is reserved if the Number of SS field is greater than 0. |
|---|---|---|---|

The Dual Polarization TRN Training element included in the EMDG-Header-A field indicates whether consecutive TRN units for each beamform (AVW) appended to this packet have different polarizations. The TRN field enable the transmitter and the receiver to perform AWV training. If the Dual Polarization TRN Training element included in the EMDG-Header-A field is set to 1, it indicates that the TRN field appended to the packet has different polarizations for each beamform. If Dual Polarization TRN Training element included in the EMDG-Header-A field is set to 0, it instructs that the TRN field appended to the packet has one polarization for each beamform. If the Dual Polarization TRN Training element included in the EMDG-Header-A field is set to 1, it also indicates that the dual polarization procedure for LOS is used.

In other example, the indication whether a dual polarization procedure for LOS is used may be included in an EMDG-Header-A2 subfield. The EDMG-Header-A2 subfield is transmitted in the second LDPC codeword. The indication whether a dual polarization procedure for LOS included in the EMDG-Header-A2 subfield may be a Dual Polarization TRN training element which may refer to table 7 as follows:

TABLE 7

| Dual Polarization TRN Training | 1 | 6 | When set to 1 indicates that the TRN field sequences appended to this packet have different polarization for the same sector (AWV). When set to 0 indicates that TRN field sequences appended to this packet are without polarization change per each AWV (beamform) |
|---|---|---|---|

The Dual Polarization TRN training element included in the EMDG-Header-A2 subfield indicates whether the TRN units appended to this packet for each beamform (AVW) have different polarizations. If the Dual Polarization TRN training element included in the EMDG-Header-A2 subfield is set to 1, it indicates that the TRN field appended to the packet has different polarizations for each beamform. If Dual Polarization TRN Training element included in the EMDG-Header-A2 subfield is set to 0, it instructs that the TRN field appended to the packet has one polarization for each beamform. If the Dual Polarization TRN Training element included in the EMDG-Header-A2 subfield is set to 1, it also indicates that the dual polarization procedure for LOS is used.

In table 7, the "1" indicates the Dual polarization TRN training element takes 1 bits. The "6" indicates the bit position of the Dual polarization TRN training element. In table 6, the "1" indicates the Dual polarization TRN training element takes 1 bits. The "48" indicates the bit position of the Dual polarization TRN training element.

In other example, the indication whether a dual polarization procedure for LOS is used may be included in a subfield (B13) of beamforming capability field format. The indication whether a dual polarization procedure for LOS is used included the subfield (B13) of beamforming capability field format may be a Dual Polarization TRN Supported element which may refer to table 8 as following.

field format of table 8 may indicate whether to support for the Dual polarization TRN procedure. If the Dual polarization TRN element is set to 1, it indicates to support the Dual polarization TRN procedure, the TRN sequences may be transmitted with different polarizations. If the Dual polarization TRN element is set to 0, it instructs to support the Dual polarization TRN procedure, the TRN sequences may be transmitted with one polarization.

In other example, the indication whether a dual polarization procedure for LOS is used may be included in a DMG Beam Refinement element. The DMG Beam Refinement element may refer to FIG. 9-512 of IEEE 802.11. The Dual polarization TRN element may replace a reserved bit in FIG. 9-512.

The dual polarization TRN element in the a DMG Beam Refinement element which refer to Figure a DMG Beam Refinement element may be EDMG Dual Polarization TRN Channel Measurement Present. EDMG Dual Polarization TRN Channel Measurement Present equal to 1 indicates that the EDMG Channel Measurement Feedback element contains the Dual Polarization TRN Measurement field. When EDMG Dual Polarization TRN Channel Measurement Present equal to 0 the EDMG Channel Measurement Feedback element does not contain the Dual Polarization TRN Measurement field.

The Dual Polarization Power Difference subfield indicates the radiated power difference between different polar-

TABLE 8

| B9 First Path Training Supported | B11 Hybrid Beamforming and MU-MIMO Supported | B12 Hybrid Beamforming and SU-MIMO Supported | B13 Dual Polarization TRN Supported | B14B17 Dual Polarization Power Difference | B18B23 Reserved |
|---|---|---|---|---|---|
| ... | | | | | |
| Bits: 1 | 1 | | 5 | 1 | |

The Dual Polarization TRN Supported element included in the subfield of beamforming capability field format indicates whether enable for Dual polarization TRN procedure. If the Dual polarization TRN element is set to 1, it instructs to enable the Dual polarization TRN procedure, the TRN sequences may be transmitted with different polarizations, which means that the Dual polarization TRN procedure is used. If the Dual Polarization TRN Supported element is set to 0, it instructs to not enable the Dual polarization TRN procedure, the TRN sequences may be transmitted with one polarization, which means that the Dual Polarization TRN procedure is used.

The Dual Polarization Power Difference subfield indicates a radiated power difference of each of the polarization. The Dual Polarization Power Difference may be indicated as in table 8.

The Dual Polarization TRN Supported element and the Dual Polarization Power Difference may also be presented in table 9 as a dual polarization TRN capability field format as following:

TABLE 9

| Dual Polarization TRN Supported | TRN Power difference |
|---|---|
| Bits 1 | 3 |

The indication whether a dual polarization procedure for LOS is used included in dual polarization TRN capability izations. The TRN Power Difference indicates in dB the difference in a radiated power for the consecutive TRNs sequences with different polarization.

The radiated power difference between the first TRN subfield and the second TRN subfield values are presented in the table 10.

TABLE 10

| TRN Power difference bits | TRN power difference between the first TRN polarization and the second TRN polarization(dB) |
|---|---|
| 000 | 0 |
| 001 | 1 |
| 010 | 2 |
| 011 | 3 or larger |
| 101 | −1 |
| 110 | −2 |
| 111 | −3 |
| 100 | −4 or smaller |

The polarization described from FIGS. 6A to 6C, tables 3 to 10 specify details for the dual polarizations procedure. Dual polarization comprises two polarizations. In the dual polarization procedure for LOS determination, the same TRN (the same sequence of bits in wave signals) is sent in the same directions with the two different polarizations, one of the two polarizations may be referred to the first polarization, the other of the two polarizations may be referred to the second polarization. Therefore the first TRN is the first polarization transmitted TRN in the direction, the second TRN is the second polarization transmitted TRN in the same direction.

The polarization described from FIGS. 1A to 3C, and FIG. 5, tables 1 to 2 is different polarizations for different directions, such as a vertical polarization, a horizontal polarization and a 45 degrees polarization. Different direction polarization correspond to different path.

In other example, the procedure of LOS determination described in FIGS. 1A to 3C, and FIG. 5, tables 1 to 2 may be combined with the procedure of LOS determination described in FIGS. 6A to 6C, tables 3 to 10. The LOS determining request described in steps 302, 302', 302", 602, 602' and 602" may comprises the indication whether a dual polarization procedure is used and combined with first path training.

If the receiver 104 and transmitter 102 confirm both of the transmitter 102 and the receiver 104 support the Dual polarization TRN procedure and the indication of first path training via the message, the packet comprises an indication to use the First Path BF training and the indication of a dual polarization procedure is used.

When the LOS procedure utilizes only two different polarizations transmissions of the same TRN sequence, the procedure is named Dual Polarization TRN.

As previously stated a Dual Polarization TRN procedure involves transmitting twice the same TRN sequence at different polarization and the receiver measuring the received signal at each polarization.

The Dual Polarization TRN procedure (for LOS) can be combined with the First Path Training or not.

If the Dual Polarization TRN procedure is combined with the First Path Training the receiver will measure only the first received copy (tap) for each polarizations transmission. In order to do this the transmission of the EDMG BRP Request should have enabled both First Path BF and Dual Polarization TRN procedures.

Figure 4:
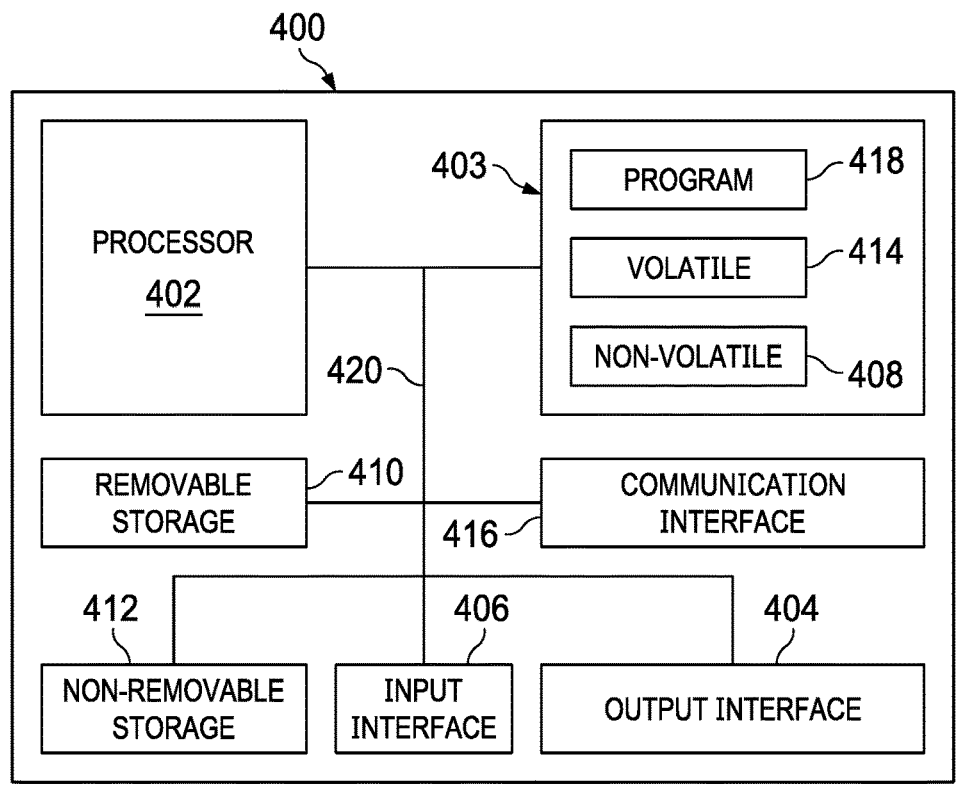
FIG. 4 illustrates a block diagram of hierarchical a device may be transmitter 102 or a receiver 104 according to an embodiment of the disclosure.

FIG. 4 illustrates a block diagram of hierarchical a device 400 which may be transmitter 102 or a receiver 104 according to an embodiment of the disclosure, and the device that may be used for implementing the methods disclosed herein.

Specific devices may utilize all of the components shown, or only a subset of the components, and levels of integration may vary from device to device. Furthermore, a device may contain multiple instances of a component, such as multiple processing units, processors, memories, transmitters, receivers, etc. The device 400 may comprise a processing unit equipped with one or more input/output devices, such as a speaker, microphone, mouse, touchscreen, keypad, keyboard, printer, 407, a display 408, and the like. The processing unit may include a central processing unit (CPU) 410, memory 415, a mass storage device 420, a video adapter 425, and an I/O interface 430 connected to a bus 435.

The bus 435 may be one or more of any type of several bus architectures including a memory bus or memory controller, a peripheral bus, video bus, or the like. The CPU 410 may comprise any type of electronic data processor. The memory 415 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 815 may include ROM for use at boot-up, and DRAM for program and data storage for use while executing programs.

The mass storage device 420 may comprise any type of non-transitory storage device configured to store data, programs, and other information and to make the data, programs, and other information accessible via the bus 435. The mass storage device 420 may comprise, for example, one or more of a solid state drive, hard disk drive, a magnetic disk drive, an optical disk drive, or the like.

The video adapter 425 and the I/O interface 430 provide interfaces to couple external input and output devices to the processing unit. As illustrated, examples of input and output devices include the display 807 coupled to the video adapter 425 and the mouse/keyboard/printer 805 coupled to the I/O interface 430. Other devices may be coupled to the processing unit, and additional or fewer interface devices may be utilized. For example, a serial interface such as Universal Serial Bus (USB) (not shown) may be used to provide an interface for a printer.

The device 400 also includes one or more network interfaces 450, which may comprise wired links, such as an Ethernet cable or the like, and/or wireless links to access nodes or different networks 455. The network interface 850 allows the processing system 400 to communicate with remote units via the network(s) 455. For example, the network interface 450 may provide wireless communication via one or more transmitters/transmit antennas and one or more receivers/receive antennas. In an embodiment, the processing system 800 is coupled to a local-area network or a wide-area network 855 for data processing and communications with remote devices, such as other processing units, the Internet, remote storage facilities, or the like.

Although a combination of features is shown in the illustrated examples, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   sending, by a first device, a line of sight (LOS) determination request to a second device, the LOS determination request including an indication that a dual polarization procedure is supported for LOS determination; and
   performing, by the first device, the dual polarization procedure to determine whether a LOS channel exists between the first device and the second device, wherein performing the dual polarization procedure includes communicating wave signals carrying the same sequence of bits using two different polarizations in the same direction between the first device and the second device to determine whether the LOS channel exists between the first device and the second device.

2. The method of claim 1, wherein the LOS determination request is an enhanced directional multi-gigabit (EDMG) beam refinement protocol (BRP) request.

3. The method of claim 2, wherein the indication of the dual polarization procedure for LOS determination is carried in a body or header part of the EDMG BRP request.

4. The method of claim 2, wherein the indication of the dual polarization procedure for LOS determination is included in RXVECTOR parameters or TXVECTOR parameters of the EDMG BRP request.

5. The method of claim 2, wherein the indication of the dual polarization procedure for LOS determination is carried in an EMDG-Header-A field of the EDMG BRP request.

6. The method of claim 2, wherein the indication of the dual polarization procedure for LOS determination is carried in an EMDG-Header-A2 subfield the EDMG BRP request.

7. The method of claim 2, wherein the indication of the dual polarization procedure for LOS determination is carried in a beamforming capability subfield of the EDMG BRP request.

8. The method of claim 2, wherein the indication of the dual polarization procedure for LOS determination is carried in a directional multi-gigabyte (DMG) Beam Refinement element of the EDMG BRP request.

9. The method of claim 1, wherein the first device transmits the wave signals carrying the same sequence of bits using the two different polarizations from the second device.

10. The method of claim 9, wherein performing the dual polarization procedure for LOS determination comprises:
    transmitting, by the first device, the wave signals carrying the same sequence of bits using the two different polarizations.

11. The method of claim 10, wherein performing the dual polarization procedure for LOS determination further comprises:
    receiving, by the first device, channel measurements for each of the wave signals from the second device; and
    comparing the channel measurements of the wave signals to determine whether the LOS channel exists between the first device and the second device.

12. The method of claim 1, wherein the first device receives the wave signals carrying the same sequence of bits using the two different polarizations from the second device.

13. The method of claim 12, wherein performing the dual polarization procedure for LOS determination further comprises:
    receiving, by the first device, the wave signals carrying the same sequence of bits using the two different polarizations from the second device;
    obtaining, by the first device, channel measurements for each of the wave signals; and
    comparing, by the first device, the channel measurements for each of the wave signals to determine whether the LOS channel exists between the first device and the second device.

14. The method of claim 12, wherein performing the dual polarization procedure for LOS determination further comprises:
    receiving, by the first device, the wave signals carrying the same sequence of bits using the two different polarizations from the second device;
    obtaining, by the first device, channel measurements for each of the wave signals; and
    sending, by the first device, the channel measurements for each of the wave signals to the second device.

15. The method of claim 14, wherein the second device compares the channel measurements for each of the wave signals to determine whether the LOS channel exists between the first device and the second device.

16. A first device comprising:
    a processor; and
    a non-transitory computer readable storage medium storing programming for execution by the processor, the programming including instructions to:
    send a line of sight (LOS) determination request to a second device, the LOS determination request including an indication that a dual polarization procedure is supported for LOS determination; and
    perform the dual polarization procedure to determine whether a LOS channel exists between the first device and the second device, wherein the instructions to perform the dual polarization procedure includes instructions to communicate wave signals carrying the same sequence of bits using two different polarizations in the same direction between the first device and the second device to determine whether the LOS channel exists between the first device and the second device.

17. A method comprising:
    sending, by a first device, a message to a second device, the message including a field indicating that the first device supports a dual polarization procedure for line of sight (LOS) determination, wherein the dual polarization procedure for LOS determination includes communicating wave signals carrying the same sequence of bits using two different polarizations in the same direction between the first device and the second device to determine whether a LOS path exists between the first device and the second device.

18. The method of claim 17, wherein the message further includes a first path training indication indicating that the first device is capable of determining a shortest path from a plurality of paths.

19. The method of claim 17, wherein the message is an enhanced directional multi-gigabit (EDMG) beam refinement protocol (BRP) request.

20. The method of claim 19, wherein the indication of the dual polarization procedure for LOS determination is carried in a body or header part of the EDMG BRP request.

21. The method of claim 19, wherein the EDMG BRP request is broadcast to multiple devices including the second device.

22. The method of claim 17, further comprising performing the dual polarization procedure for LOS determination.

23. The method of claim 22, wherein performing the dual polarization procedure for LOS determination comprises:
transmitting, by the first device, the wave signals carrying the same sequence of bits using the two different polarizations.

24. The method of claim 22, wherein performing the dual polarization procedure for LOS determination further comprises:
receiving, by the first device, channel measurements for each of the wave signals from the second device; and
comparing the channel measurements of the wave signals to determine whether the LOS channel exists between the first device and the second device.

25. The method of claim 22, wherein performing the dual polarization procedure for LOS determination comprises:
receiving, by the first device, the wave signals carrying the same sequence of bits using the two different polarizations from the second device;
obtaining, by the first device, channel measurements for each of the wave signals; and
comparing, by the first device, the channel measurements for each of the wave signals to determine whether the LOS channel exists between the first device and the second device.

26. The method of claim 22, wherein performing the dual polarization procedure for LOS determination comprises:
receiving, by the first device, the wave signals carrying the same sequence of bits using the two different polarizations from the second device;
obtaining, by the first device, channel measurements for each of the wave signals; and
sending, by the first device, the channel measurements for each of the wave signals to the second device.

27. The method of claim 22, wherein performing the dual polarization procedure for LOS determination comprises:
receiving, by the first device, three or more wave signals carrying the same sequence of bits using different polarizations from the second device, wherein each polarization corresponds to one copy of the wave signal; and
determining whether the LOS path exists between the first device and the second device based on intensities of the three or more wave signals.

28. The method of claim 27, wherein determining whether the LOS path exists between the first device and the second device based on intensities of the three or more wave signals comprises determining that the LOS path exists when the intensities of the three or more wave signals are within a threshold of one another.

29. A first device comprising:
a processor; and
a non-transitory computer readable storage medium storing programming for execution by the processor, the programming including instructions to:
send a message to a second device, the message including a field indicating that the first device supports a dual polarization procedure for line of sight (LOS) determination, wherein the dual polarization procedure for LOS determination includes communicating wave signals carrying the same sequence of bits using two different polarizations in the same direction between the first device and the second device to determine whether a LOS path exists between the first device and the second device.

30. The first device of claim 29, wherein the message further includes a first path training indication indicating that the first device is capable of determining a shortest path from a plurality of paths.

* * * * *